(12) United States Patent
Liu et al.

(10) Patent No.: US 9,441,354 B2
(45) Date of Patent: Sep. 13, 2016

(54) WATER INLET VALVE

(75) Inventors: Yongmao Liu, Xiamen (CN); Zipeng Zhang, Xiamen (CN)

(73) Assignee: LAB (XIAMEN)SANITARY FITTINGS INC., Xiamen, Fujian (CN)

( * ) Notice: Subject to any disclaimer, the term of this patent is extended or adjusted under 35 U.S.C. 154(b) by 162 days.

(21) Appl. No.: 14/400,368

(22) PCT Filed: Jun. 8, 2012

(86) PCT No.: PCT/CN2012/076627
§ 371 (c)(1),
(2), (4) Date: Feb. 2, 2015

(87) PCT Pub. No.: WO2013/181835
PCT Pub. Date: Dec. 12, 2013

(65) Prior Publication Data
US 2015/0211220 A1    Jul. 30, 2015

(51) Int. Cl.

| | |
|---|---|
| *F16K 31/18* | (2006.01) |
| *E03D 1/24* | (2006.01) |
| *E03D 1/36* | (2006.01) |
| *E03D 1/00* | (2006.01) |
| *E03D 1/32* | (2006.01) |
| *E03D 1/33* | (2006.01) |
| *F16K 21/18* | (2006.01) |

(52) U.S. Cl.
CPC . *E03D 1/32* (2013.01); *E03D 1/33* (2013.01); *F16K 21/18* (2013.01); *F16K 21/185* (2013.01); *Y10T 137/7349* (2015.04); *Y10T 137/7374* (2015.04); *Y10T 137/7404* (2015.04); *Y10T 137/7462* (2015.04); *Y10T 137/7465* (2015.04)

(58) Field of Classification Search
CPC .................. Y10T 137/2536; Y10T 137/2768; Y10T 137/2795; Y10T 137/7349; Y10T 137/7352; Y10T 137/7358; Y10T 137/7365; Y10T 137/7368; Y10T 137/7371; Y10T 137/7374; Y10T 137/7394; Y10T 137/7397; Y10T 137/7404; Y10T 137/742; Y10T 137/7423; Y10T 137/7439; Y10T 137/7446; Y10T 137/7462; Y10T 137/7472; Y10T 137/7485; Y10T 137/7494; E03D 1/00; E03D 1/32; E03D 1/33; F16K 31/28; F16K 33/00; F16K 21/00; F16K 21/18; F16K 21/185; F16K 21/20
USPC ......... 251/89, 89.5, 90, 91; 4/331, 366, 415; 137/403, 404, 406, 407, 409, 414, 423, 137/427, 428, 429, 434, 436, 445, 448, 444, 137/451

See application file for complete search history.

(56) References Cited

U.S. PATENT DOCUMENTS

| | | | | |
|---|---|---|---|---|
| 4,993,086 A | * | 2/1991 | Palmer ..................... | E03D 1/00 137/4 |
| 6,913,035 B2 | * | 7/2005 | Huang ...................... | E03D 1/32 137/425 |
| 8,650,672 B2 | * | 2/2014 | Liu ............................ | E03D 1/00 4/415 |
| 2012/0318382 A1 | * | 12/2012 | Magar ...................... | E03D 1/00 137/409 |

* cited by examiner

*Primary Examiner* — Mary McManmom
*Assistant Examiner* — Hailey K Do

(57) ABSTRACT

A water inlet valve includes a water sealing piston installed in a water inlet pipe and a top cover. A water storage cylinder is fixed outside the water inlet pipe. A lower water cavity has an upper air vent and a lower water inlet. A siphon is arranged in a water storage cavity and communicated with the lower water cavity. A first magnetic element is arranged on a floater. A small buoy is arranged outside the water storage cylinder to open and close the upper air vent. A gutter is formed on the periphery of the top cover. A lever and an eccentric shaft are arranged outside the water inlet pipe and the top cover. The connecting rod is connected with the lever and the eccentric shaft. The lever is provided with an energy storage spring, a second magnetic element, and a restoring spring.

10 Claims, 12 Drawing Sheets

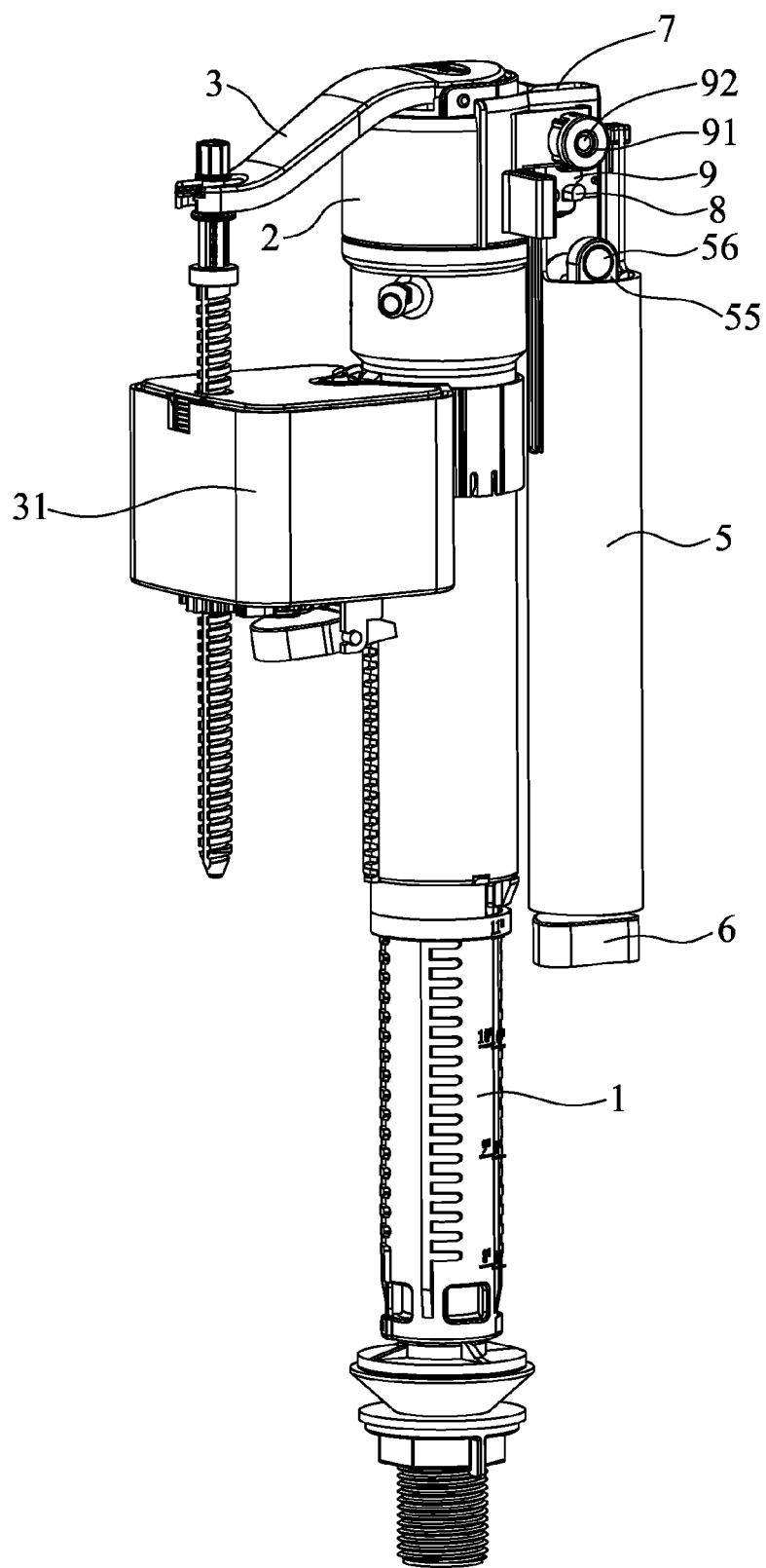
F I G. 1

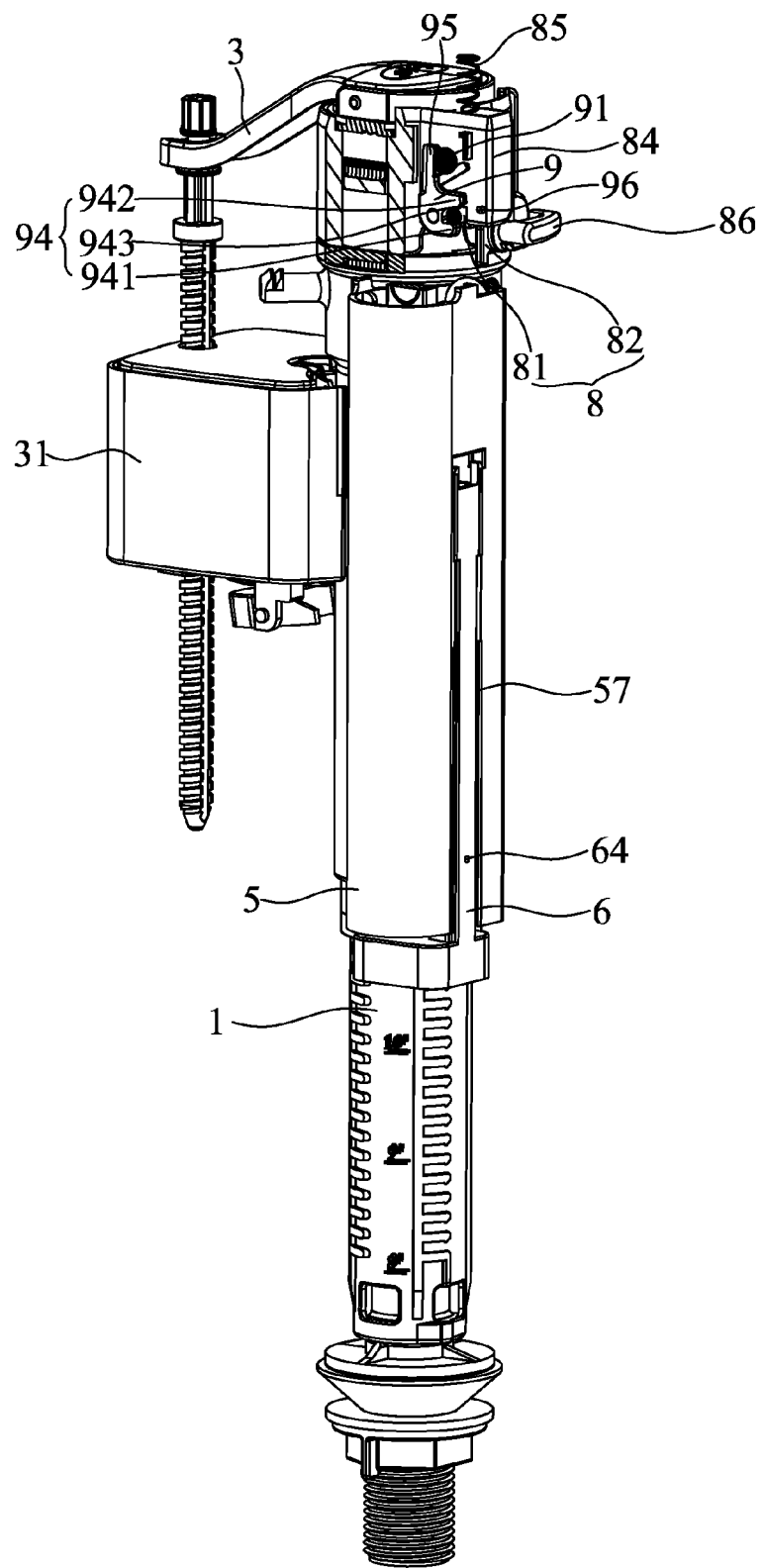
F I G. 4

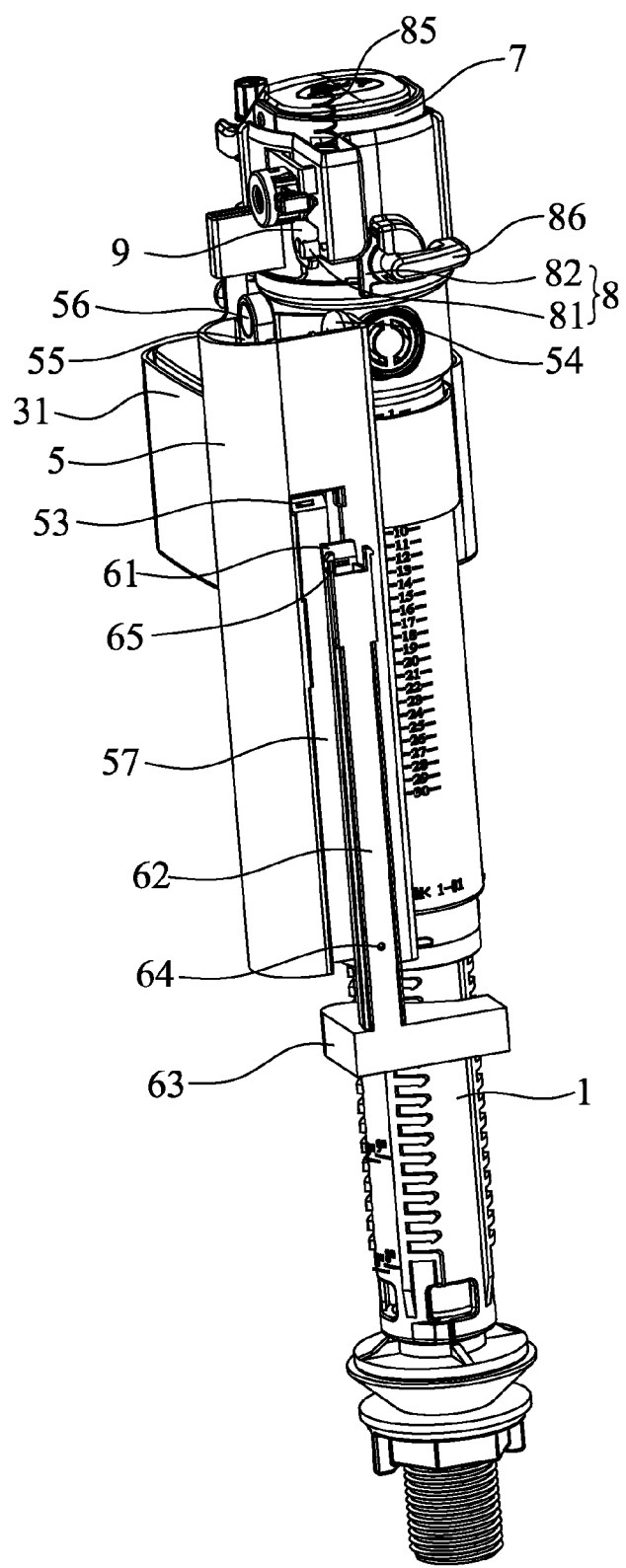
F I G. 7

WATER INLET VALVE

BACKGROUND OF THE INVENTION

1. Field of the Invention

The present invention relates to a water inlet valve, and more particularly to a water inlet valve which can stop water inflow in time under the condition that water tank accessories and a water tank fail.

2. Description of the Prior Art

A conventional water inlet valve comprises a water inlet pipe, a top cover, a water stop pad, a back-pressure pad, a swing arm, and a buoy. The lower end of the water inlet pipe is installed on a water supply pipe of a water tank. The top cover is installed on the upper end of the water inlet pipe. The interior of the water inlet pipe is formed with a water inlet cavity. The water inlet cavity is formed with a water stop surface having a water inlet. The water stop pad is installed in the water inlet cavity, corresponding in position to the water inlet and located above the water stop surface. The top cover is formed with a back-pressure hole. The middle section of the swing arm is pivotally connected to the top cover. One end of the swing arm faces the back-pressure hole and is installed with the back-pressure pad. The other end of the swing arm is connected with an adjustment rod of the buoy. Seal members are provided between the components to ensure water tightness. During use, when the water level in the water tank descends, the buoy will descend by gravity to bring the swing arm to deflect. The back-pressure pad is to open the back-pressure hole. The water from the water supply pipe flows through the water inlet pipe, the water inlet, the top cover, and the back-pressure hole to the water tank for water inflow. When the water level in the water tank ascends, the buoy will ascend by buoyancy to bring the swing arm to deflect. The back-pressure pad is to close the back-pressure hole. The water cannot enter the water tank from the back-pressure hole of the top cover. The water stop pad is deformed by back-pressure force to seal the water inlet of the water stop surface to stop water inflow.

However, the water tank accessories (a water inlet valve, a drain valve, a button, and other sealing members) may fail after a period of time. For example, the drain valve cannot be closed tightly to leak slowly (a leak of less water), the part of the drain valve or the button fail and are unable to close to drain all the time (a leak of much water), or the water inlet valve is unable to stop water inflow to cause an overflowing. The aforesaid situations result in waste of water resources. Accordingly, the inventor of the present invention has devoted himself based on his many years of practical experiences to solve these problems.

SUMMARY OF THE INVENTION

The primary object of the present invention is to provide a water inlet valve. Through the water inlet valve, water inflow can be stopped in time under the condition that water tank accessories and a water tank fail, so that waste of water resources is reduced.

In order to achieve the aforesaid objective, the water inlet valve of the present invention comprises a water inlet pipe, a top cover, a water stop pad, a back-pressure pad, a swing arm, and a buoy. A water inlet cavity is formed by the top cover and the interior of the water inlet pipe. A water sealing piston and an eccentric shaft are provided in the water inlet cavity and located below the water stop pad. One end of the eccentric shaft is inserted through the water sealing piston. Another end of the eccentric shaft, in a closed state, extends out of the water inlet cavity. The water sealing piston is brought by the eccentric shaft to move up and down along an axial direction to close or open a water inlet of a water stop surface. A water storage cylinder is fixed to the outside of the water inlet pipe. The water storage cylinder has a water storage cavity at an upper portion thereof and a lower water cavity at a lower portion thereof. The top of the water storage cavity is open. The lower water cavity has an upper air vent and a lower water inlet. A siphon is installed in the water storage cavity. One end of the siphon is disposed close to the bottom of the water storage cavity. Another end of the siphon is inserted through the bottom of the water storage cavity and communicated with the lower water cavity. A floater is provided in the water storage cavity. A first magnetic element is installed on the top of the floater. The outside of the water storage cylinder is provided with a small buoy in a liftable way. The small buoy is provided with an opening and closing plate corresponding to the upper air vent of the lower water cavity. The opening and closing plate is capable of opening or closing the upper air vent as the small buoy is lifted or dropped. The circumferential edge of the top cover is formed with a gutter. The gutter is formed with a water drop opening facing the water storage cavity of the water storage cylinder. The outsides of the water inlet pipe and the top cover are provided with a connecting rod, a lever, and a bolt. One end of the connecting rod is connected to one end of the lever. Another end of the connecting rod is fixed to another end of the eccentric shaft. An energy storage spring is provided on the connecting rod or the lever. Another end of the lever is provided with the bolt which can be plugged or pulled out. The bolt is provided with a second magnetic element corresponding to the first magnetic element for controlling the bolt to be pulled out and a restoring spring for the bolt to be restored and plugged.

Preferably, a seal ring is provided between the eccentric shaft and an opening of the water inlet cavity. A seal pad is provided above the water sealing piston.

Preferably, a sponge is provided in the gutter for controlling the speed of water drops.

Preferably, the top of the water inlet pipe is formed with an inner protrusion. A water sealing spring is installed on the inner protrusion. The upper end of the water sealing spring is against the bottom of the water sealing piston. The lower end of the water sealing spring is against the inner protrusion.

Preferably, the side wall of the water storage cylinder is formed with a slide trough. The upper air vent is disposed in the slide trough. The small buoy has an upper counterweight cavity and a lower buoyancy cavity. The upper counterweight cavity is slidably disposed in the slide trough. A lower portion of an outer side wall of the upper counterweight cavity is formed with a communicating hole. An upper portion of an inner side wall of the upper counterweight cavity is formed with the opening and closing plate corresponding to the upper air vent. The opening and closing plate is inclined toward the upper air vent. The lower end of the opening and closing plate is formed with an air release opening. The lower buoyancy cavity is located under the water storage cylinder.

Preferably, one end of the lever is formed with a fork. The fork has a long outer side and a short inner side. The connecting rod is composed of a first connecting rod and a second connecting rod. One end of the first connecting rod is disposed in the fork. Another end of the first connecting rod is pivotally connected to one end of the second connecting rod. Another end of the second connecting rod is fixed to another end of the eccentric shaft. The first connecting rod is formed with a lift rod extending from the first connecting rod. The lift rod is disposed in a lift trough formed at the outside of the top cover. An energy storage spring is provided in the lift trough to be against the lift rod.

Preferably, the inner side of the fork is formed with an inclined surface which is beneficial to move the first connecting rod.

Preferably, the connecting rod or the eccentric shaft is formed with a push block to push the connecting rod and to restore the lever.

Preferably, another end of the lever or the bolt is formed with a slope to guide the bolt to be plugged in.

Preferably, the lever is provided with a protrusion beside a turning axle thereof to limit the turning angle of the lever.

The present invention is a structural improvement of a water inlet valve.

The improved water inlet valve of the present invention is installed in a water tank. Under an initial state, the bolt biased by the restoring spring is inserted at one end of the lever to position the lever as well as the connecting rod. The connecting rod brings the eccentric shaft to rotate and position. The eccentric shaft brings the water sealing piston to descend so as to open the water inlet. At this time, the energy storage spring stores energy.

When in normal use, no malfunction, in the beginning of water inflow, the buoy brings the swing arm to deflect downward. The back-pressure pad opens the back-pressure hole. The water from the water supply pipe flows through the water inlet pipe, the water inlet, the top cover, and the back-pressure hole to the water tank for water inflow. Partial water is guided by the gutter and flows to the water drop opening to form water drops to drop into the water storage cavity of the water storage cylinder. When the water level of the water tank ascends, the water still enters the lower water cavity of the water storage cylinder. After the water level of the water tank ascends to a predetermined water stop level, the buoy brings the swing arm to deflect upward. The back-pressure pad closes the back-pressure hole again. The water stop pad generates a back-pressure force to block the water inlet of the water stop surface to stop water inflow.

When the drain valve is operated for a flush, the water level of the water tank and the water level of the lower water cavity of the water storage cylinder will descend. When the water level descends until the gravity of the small buoy is greater than the buoyancy, the small buoy drops rapidly and brings the opening and closing plate to move down to close the upper air vent of the lower water cavity. The water level of the lower water cavity of the water storage cylinder descends continuously and slowly to form a negative pressure in the lower water cavity. When the negative pressure reaches a certain degree, the water in the water storage cavity will be siphoned to the lower water cavity through the siphon until the water in the water storage cavity is siphoned out. The siphoning will stop. The water level of the water tank and the water level of the lower water cavity of the water storage cylinder keep on descending till flush. In the meantime, the water level of the water tank descends until the gravity of the buoy is greater than the buoyancy. The buoy brings the swing arm to deflect downward once again. The back-pressure pad is to open the back-pressure hole. The water stop pad releases pressure to disengage from the water stop surface to open the water inlet for water inflow once again. At the same time, partial water is guided by the gutter and flows to the water storage cavity as well as the lower water cavity. When the water level ascends to the predetermined position, the buoy will bring the swing arm to deflect upward. The back-pressure pad is to close the back-pressure hole again. The water stop pad generates a back-pressure force to block the water inlet to stop water inflow again.

When the part of the drain valve or the button is jammed and unable to close to cause a leak of much water, or the part of the water inlet valve malfunctions and is unable to stop water inflow to cause an overflowing, when in use, the water inlet valve will be in a feeding state all the time. Partial water is still guided by the gutter to flow into the water storage cavity of the water storage cylinder. Because the water inlet valve is in a feeding state all the time, the water level of the water storage cavity ascends continuously to bring the floater in the water storage cavity to ascend accordingly. When the first magnetic element of the floater is aligned with the second magnetic element of the bolt, the bolt is pulled out from the lever by magnetic action to release the positioning of the lever. The lever and the connecting rod are biased by the energy storage spring to deflect. The connecting rod brings the eccentric shaft to rotate. The eccentric shaft brings the water sealing piston to ascend to close the water inlet of the water stop surface for the water inlet valve to stop water inflow.

When the drain valve is leaking or the sealing portion of the water tank and the other part is leaking, namely, there is a leak of little water, the counterweight water level of the small buoy and the water level of the water tank are consistent relatively. The small buoy is unable to bring counterweight and in a floating state all the time. The lower water cavity of the water storage cylinder communicates with the atmosphere all the time, so that its water level is consistent with the water tank and won't generate native pressure. The water in the water storage cavity won't be siphoned. This way is done repeatedly. The water in the water storage cavity is accumulated continuously, so that the water level of the water storage cavity ascends continuously to bring the floater in the water storage cavity to ascend accordingly. When the first magnetic element of the floater is aligned with the second magnetic element of the bolt, the bolt is pulled out from the lever by magnetic action to release the positioning of the lever. The lever and the connecting rod are biased by the energy storage spring to deflect. The connecting rod brings the eccentric shaft to rotate. The eccentric shaft brings the water sealing piston to ascend to close the water inlet of the water stop surface, such that the water inlet valve stops feeding.

The water inlet valve of the present invention is provided with the water sealing piston driven the eccentric shaft, the connecting rod, the lever, the plug, the floater, the water storage cylinder, and the small buoy to control turning of the eccentric shaft. Thus, the water inlet valve provides normal water feeding and water stopping functions, and water inflow can be stopped in time under the condition that water tank accessories fail, so that waste of water resources is reduced.

BRIEF DESCRIPTION OF THE DRAWINGS

FIG. 1 is a perspective view according to a preferred embodiment of the present invention;

FIG. 4 is a schematic view showing the cooperative relationship of the bolt and the lever according to the preferred embodiment of the present invention;

FIG. 7 is a perspective exploded view showing the water storage cylinder and the small buoy according to the preferred embodiment of the present invention;

DETAILED DESCRIPTION OF THE PREFERRED EMBODIMENTS

Embodiments of the present invention will now be described, by way of example only, with reference to the accompanying drawings.

Figure 12:
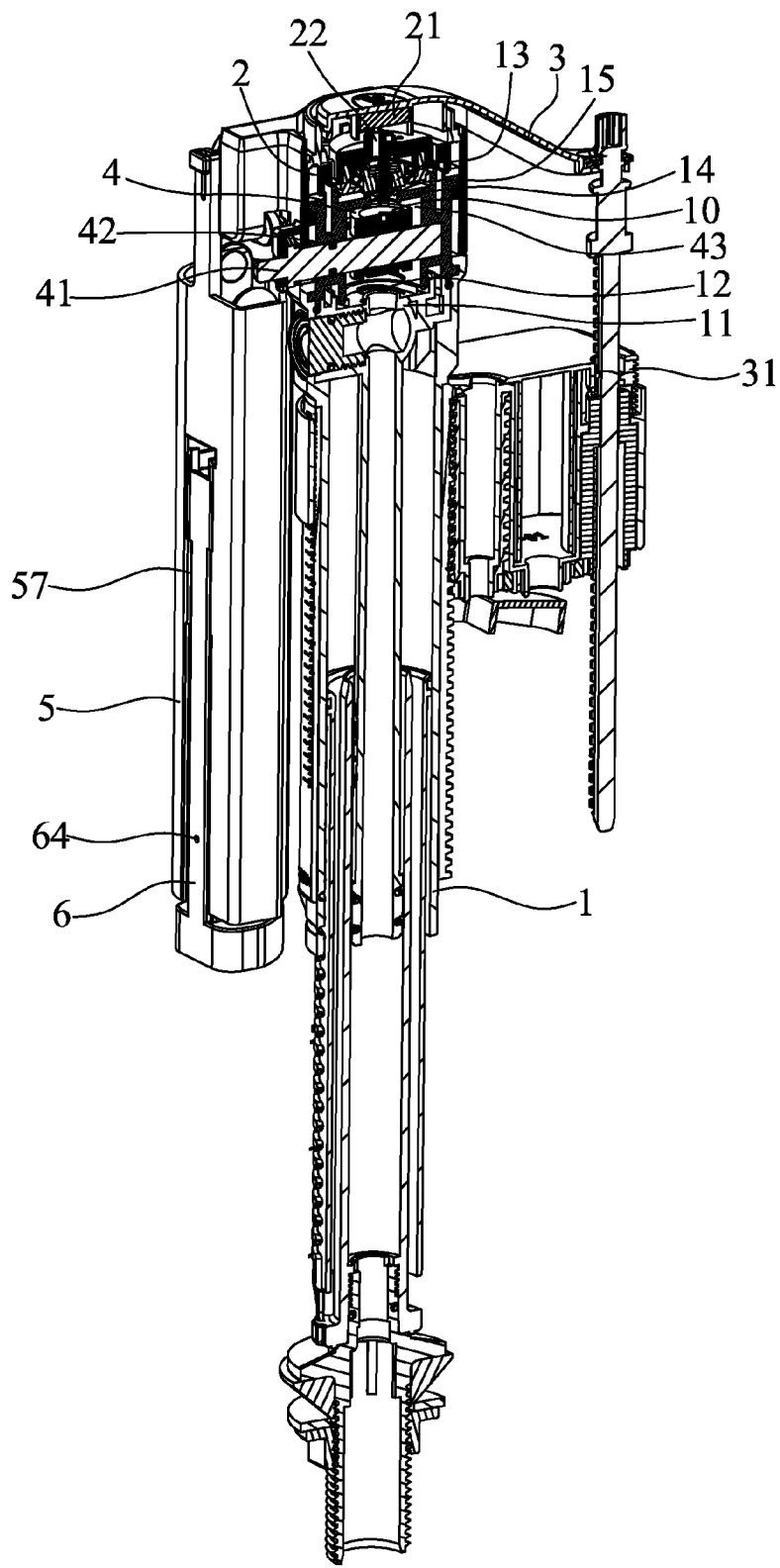
FIG. 12 is a sectional view showing the structure of the water inlet cavity of the preferred embodiment of the present invention in a normal state.

As shown in FIG. 1 and FIG. 12, the present invention disclosures a water inlet valve. The water inlet valve comprises a water inlet pipe 1, a top cover 2, a water stop pad 13, a back-pressure pad 21, a swing arm 3, and a buoy 31. This is the essential structure of an existing water inlet valve. The lower end of the water inlet pipe 1 is installed on a water supply pipe of a water tank. The top cover 2 is installed on the upper end of the water inlet pipe 1. A water inlet cavity 10 is formed by the top cover 2 and the interior of the water inlet pipe 1. The water inlet cavity 10 is formed with a water stop surface 14 having a water inlet 15. The water stop pad 13 is installed in the water inlet cavity 10, corresponding in position to the water inlet 15 and located above the water stop surface 14. The top cover 2 is formed with a back-pressure hole 22. The middle section of the swing arm 3 is pivotally connected to the top cover 2. One end of the swing arm 3 faces the back-pressure hole 22 and is installed with the back-pressure pad 21. The other end of the swing arm 3 is connected with an adjustment rod of the buoy 31. Seal members are provided between the components to ensure water tightness. During use, when the water level in the water tank descends, the buoy 31 will descend by gravity to bring the swing arm 3 to deflect. The back-pressure pad 21 is to open the back-pressure hole 22. The water from the water supply pipe flows through the water inlet pipe 1, the water inlet 15, the top cover 2, and the back-pressure hole 22 to the water tank for water inflow. When the water level in the water tank ascends, the buoy 31 will ascend by buoyancy to bring the swing arm 3 to deflect. The back-pressure pad 21 is to close the back-pressure hole 22. The water cannot enter the water tank from the back-pressure hole 22 of the top cover 2. The water stop pad 13 is deformed by back-pressure force to seal the water inlet 15 of the water stop surface 14 to stop water inflow.

The improvement of the present invention is described hereinafter.

Figure 11:
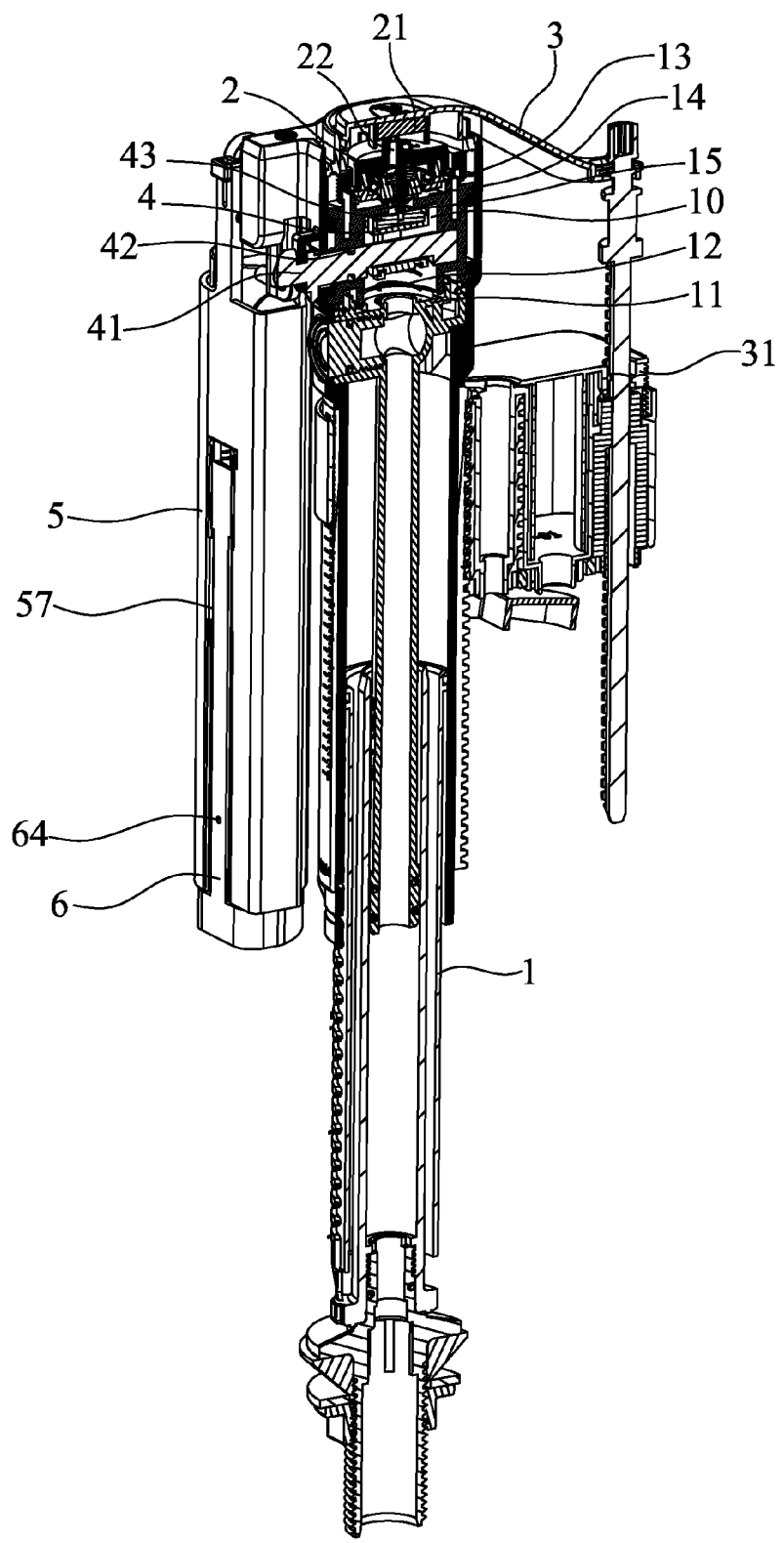
FIG. 11 is a sectional view showing the structure of the water inlet cavity of the preferred embodiment of the present invention in a water stop state.

As shown in FIG. 11 and FIG. 12, a water sealing piston 4 and an eccentric shaft 41 are provided in the water inlet cavity 10 formed by the top cover 2 and the interior of the water inlet pipe 1 and located below the water stop pad 13. One end of the eccentric shaft 41 is inserted through the water sealing piston 4, and another end of the eccentric shaft 41, in a closed state, extends out of the water inlet cavity 10. The closed state means that between the eccentric shaft 41 and the opening of the water inlet cavity 10 is in a closed state. For example, in this embodiment, a seal ring 42 is provided between the eccentric shaft 41 and the opening of the water inlet cavity 10. The water sealing piston 4 is brought by the eccentric shaft 41 to move up and down along an axial direction to close or open the water inlet 15 of the water stop surface 14. Wherein, the water sealing piston 4 can be directly brought by the eccentric shaft 41 to close the water inlet 15, alternatively, the water sealing piston 4 can be indirectly brought by the eccentric shaft 41 to close the water inlet 15, namely, the rotation of the eccentric shaft 41 enables the water sealing piston 4 to move up for a concession space. The water sealing piston 4 is pushed up by water pressure to seal the water inlet 15. The water sealing piston 4 can be brought by the eccentric shaft 41 to close the water inlet 15 in other similar ways which won't be enumerated one by one in this specification. For a better water stop effect, this embodiment is further provided with a seal pad 43 above the water sealing piston 4, alternatively, the top of the water inlet pipe 1 is formed with an inner protrusion 11. A water sealing spring 12 is installed on the inner protrusion 11. The upper end of the water sealing spring 12 is against the bottom of the water sealing piston 4, and the lower end of the water sealing spring 12 is against the inner protrusion 11. When the eccentric shaft 41 is rotated, as shown in FIG. 12, in a normal state, the long diameter of the eccentric shaft 41 cooperates with the water sealing piston 4 and the water sealing piston 4 descends to compress the water sealing spring 12 to open the water inlet 15 of the water stop surface 14. In a water stop state, the short diameter of the eccentric shaft 41 cooperates with the water sealing piston 4 and the water sealing piston 4 biased by the water sealing spring 12 ascends to close the water inlet 15 of the water stop surface 14.

As shown in FIG. 6 to FIG. 10, a water storage cylinder 5 is fixed to the outside the water inlet pipe 1. The water storage cylinder 5 has a water storage cavity 51 at an upper portion thereof. The top of the water storage cavity 51 is open. The water storage cylinder 5 has a lower water cavity 52 at a lower portion thereof. The lower water cavity 52 has an upper air vent 53 and a lower water inlet. This embodiment is directly formed with an opening. A siphon 54 is provided in the water storage cavity 51. One end of the siphon 54 is disposed close to the bottom of the water storage cavity 51, and another end of the siphon 54 is inserted through the bottom of the water storage cavity 51 and communicated with the lower water cavity 52. A floater 55 is provided in the water storage cavity 51. A first magnetic element 56 is provided on the top of the floater 55.

As shown in FIG. 2 to FIG. 9, the outside of the water storage cylinder 5 is provided with a small buoy 6 which can be lifted. The small buoy 6 is provided with an opening and closing plate 61 corresponding to the upper air vent 53 of the lower water cavity 52, as shown in FIG. 6 to FIG. 9. The opening and closing plate 61 is capable of opening the upper air vent 53 as the small buoy 6 is lifted. The opening and closing plate 61 is capable of closing the upper air vent 53 as the small buoy 6 is dropped. In this embodiment, the side wall of the water storage cylinder 5 is formed with a slide trough 57. The upper air vent 53 is disposed in the slide trough 57. The small buoy 6 has an upper counterweight cavity 62 and a lower buoyancy cavity 63. The upper counterweight cavity 62 is slidably disposed in the slide trough 57, so that the small buoy 6 can be lifted or dropped. The lower portion of the outer side wall of the upper counterweight cavity 62 is formed with a communicating hole 64. The upper portion of the inner side wall of the upper counterweight cavity 62 is formed with the opening and closing plate 61 corresponding to the upper air vent 53. For the opening and closing plate 61 to close the upper air vent 53 better, the opening and closing plate 61 is inclined toward the upper air vent 53. For the opening and closing plate 61 to open the upper air vent 53 better, the lower end of the opening and closing plate 61 is formed with an air release opening 65. The lower buoyancy cavity 63 is located under the water storage cylinder 5. The small buoy 6 can be in other configurations capable of opening and closing the upper air vent 53 when the water level ascends or descends. For example, the small buoy is located at the middle lower portion of the water storage cylinder, without the upper counterweight cavity of this embodiment. This way also brings the opening and closing plate to open or close the upper air vent.

Figure 2:
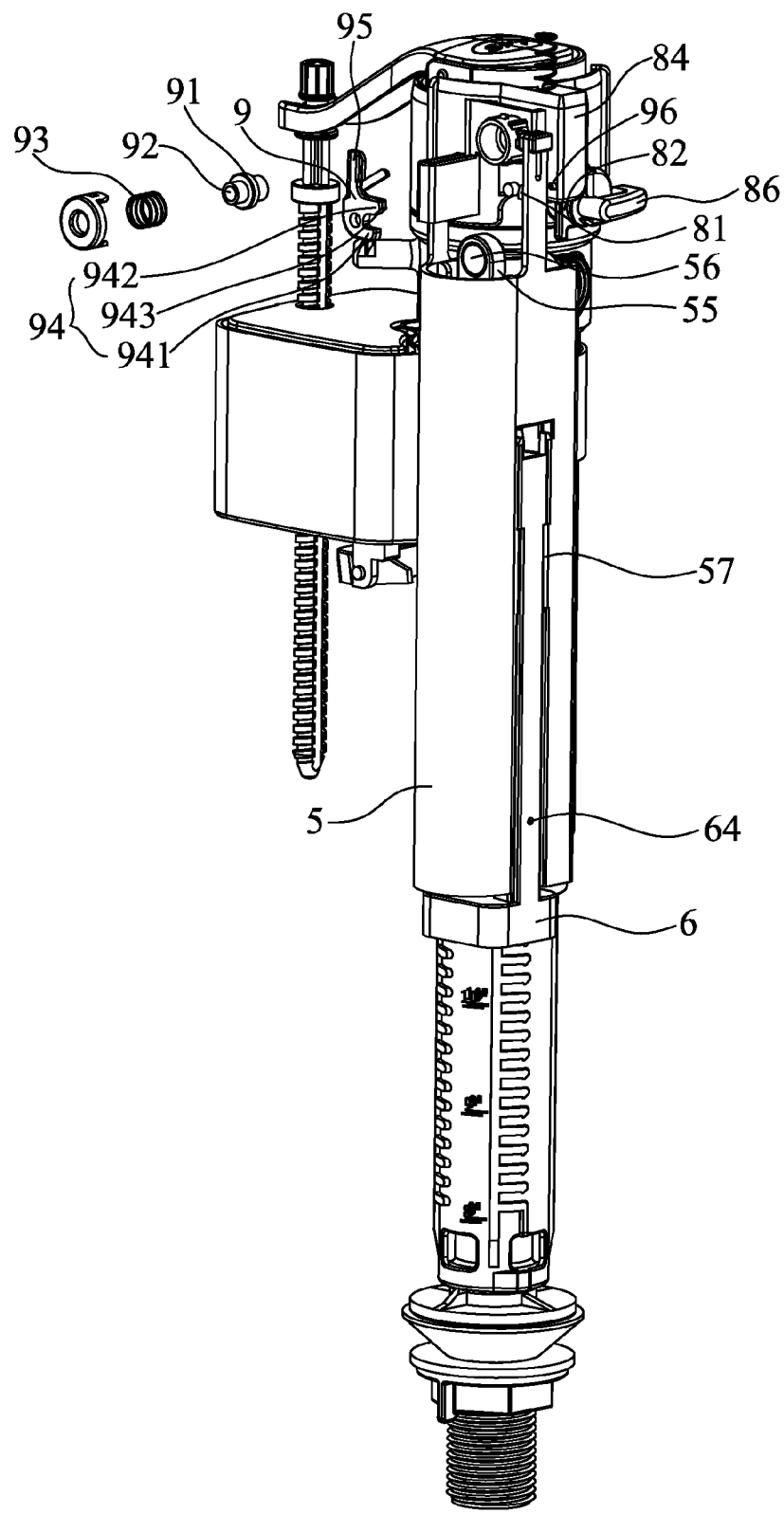
FIG. 2 is an exploded view of the bolt according to the preferred embodiment of the present invention.
Figure 3:
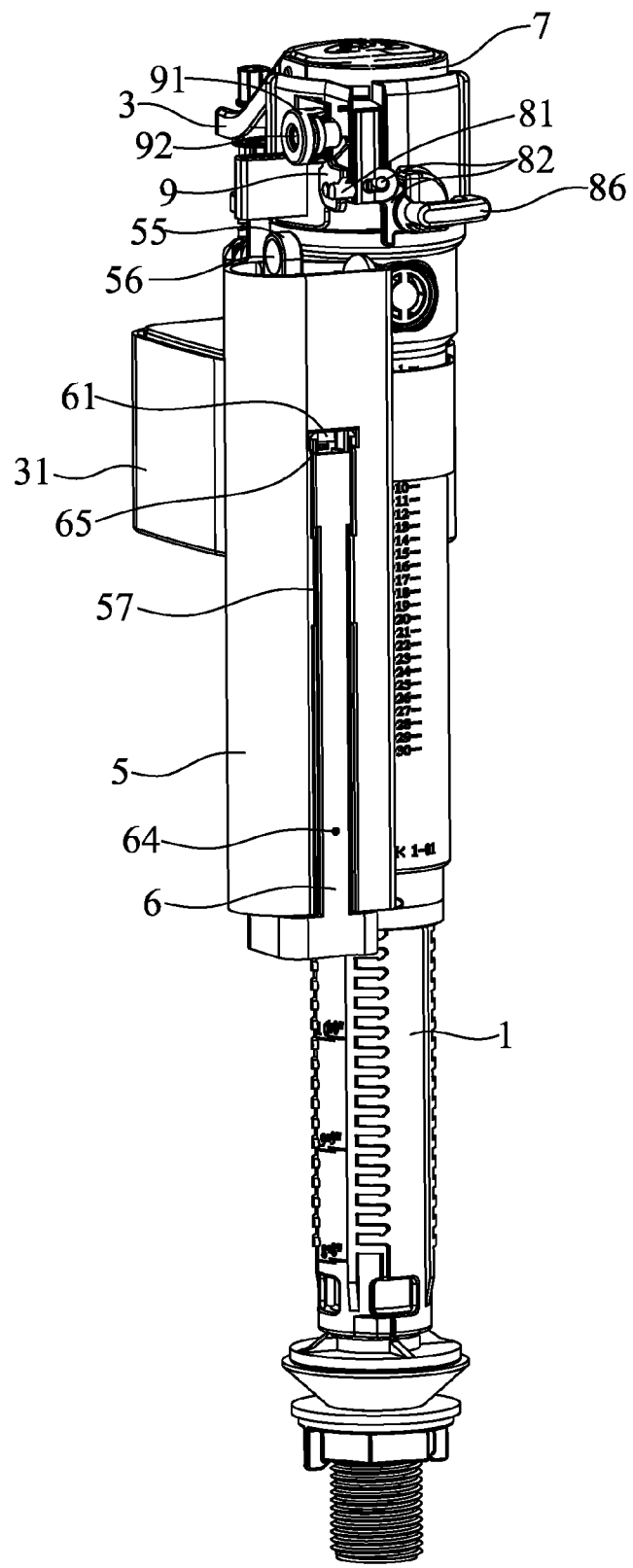
FIG. 3 is a schematic view showing the cooperative relationship of the bolt, the lever, and the connecting rod according to the preferred embodiment of the present invention.
Figure 5:
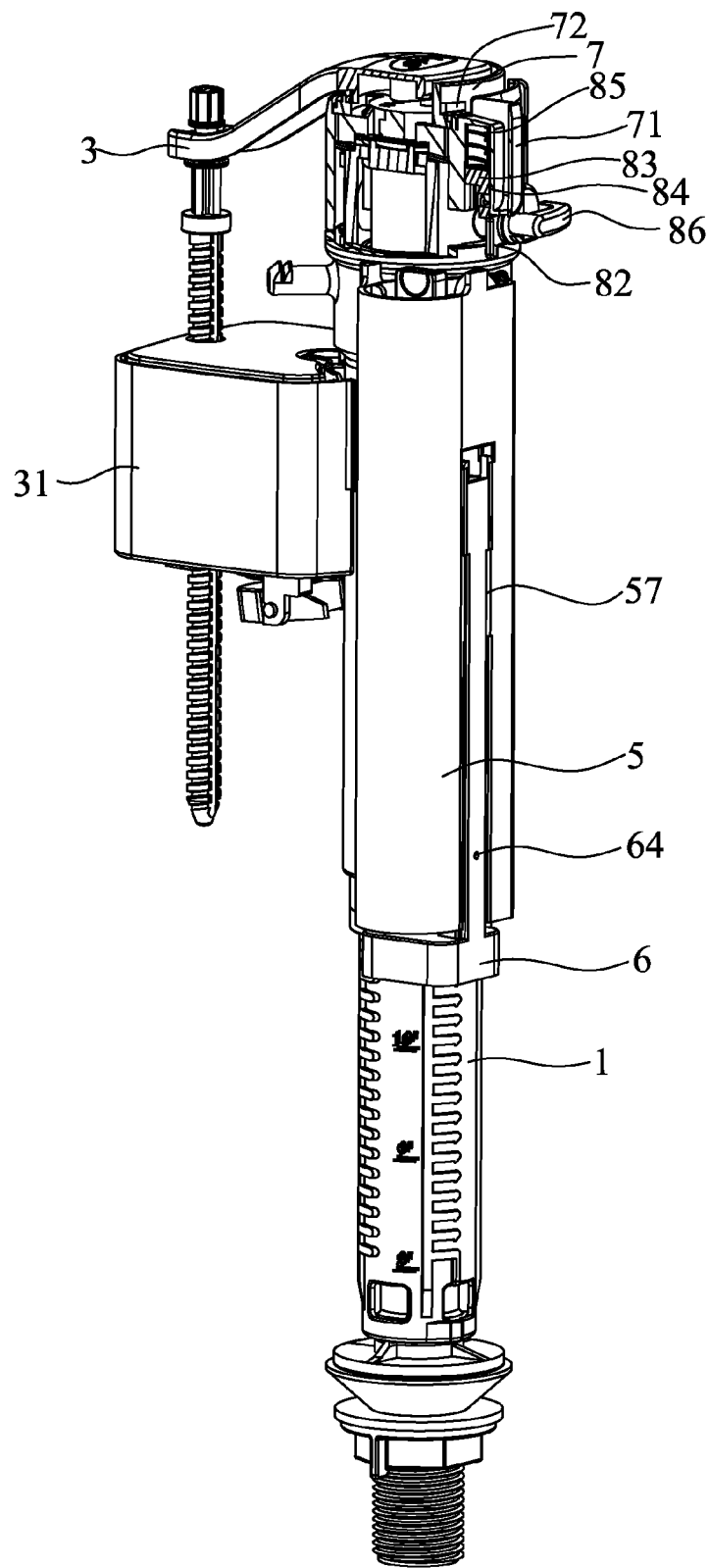
FIG. 5 is a schematic view showing the structure of the connecting rod and the gutter according to the preferred embodiment of the present invention.
Figure 6:
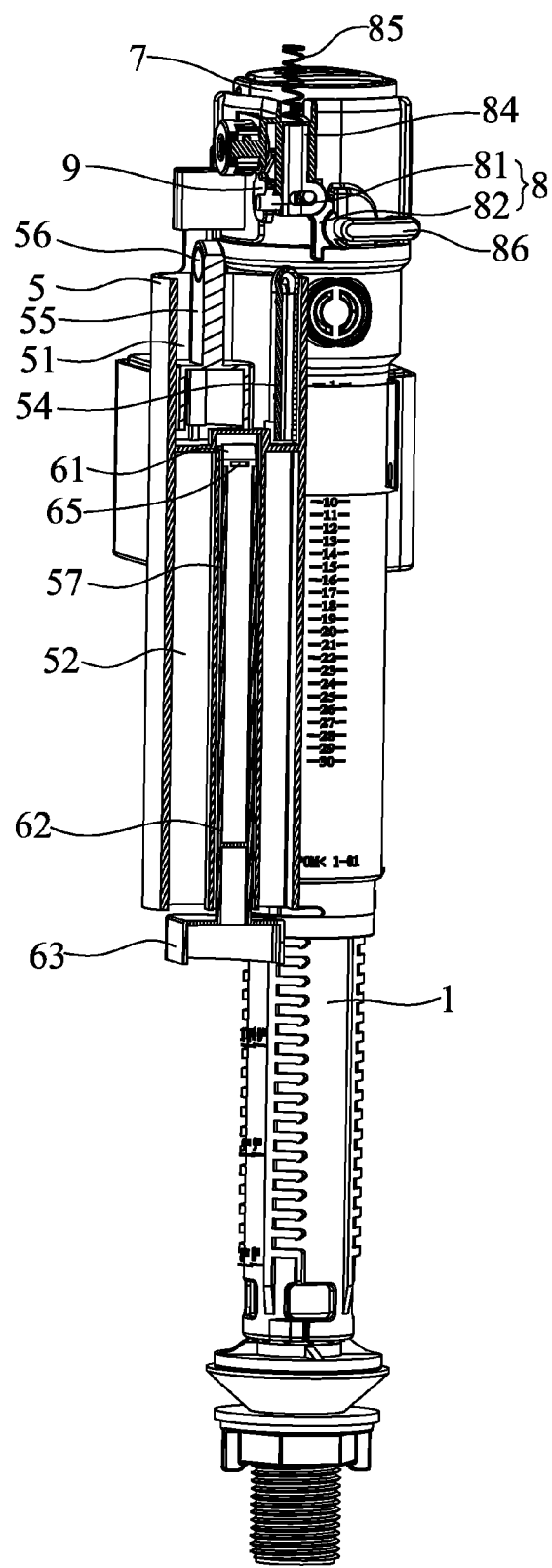
FIG. 6 is a sectional view showing the structure of the water storage cylinder and the small buoy according to the preferred embodiment of the present invention.
Figure 8:
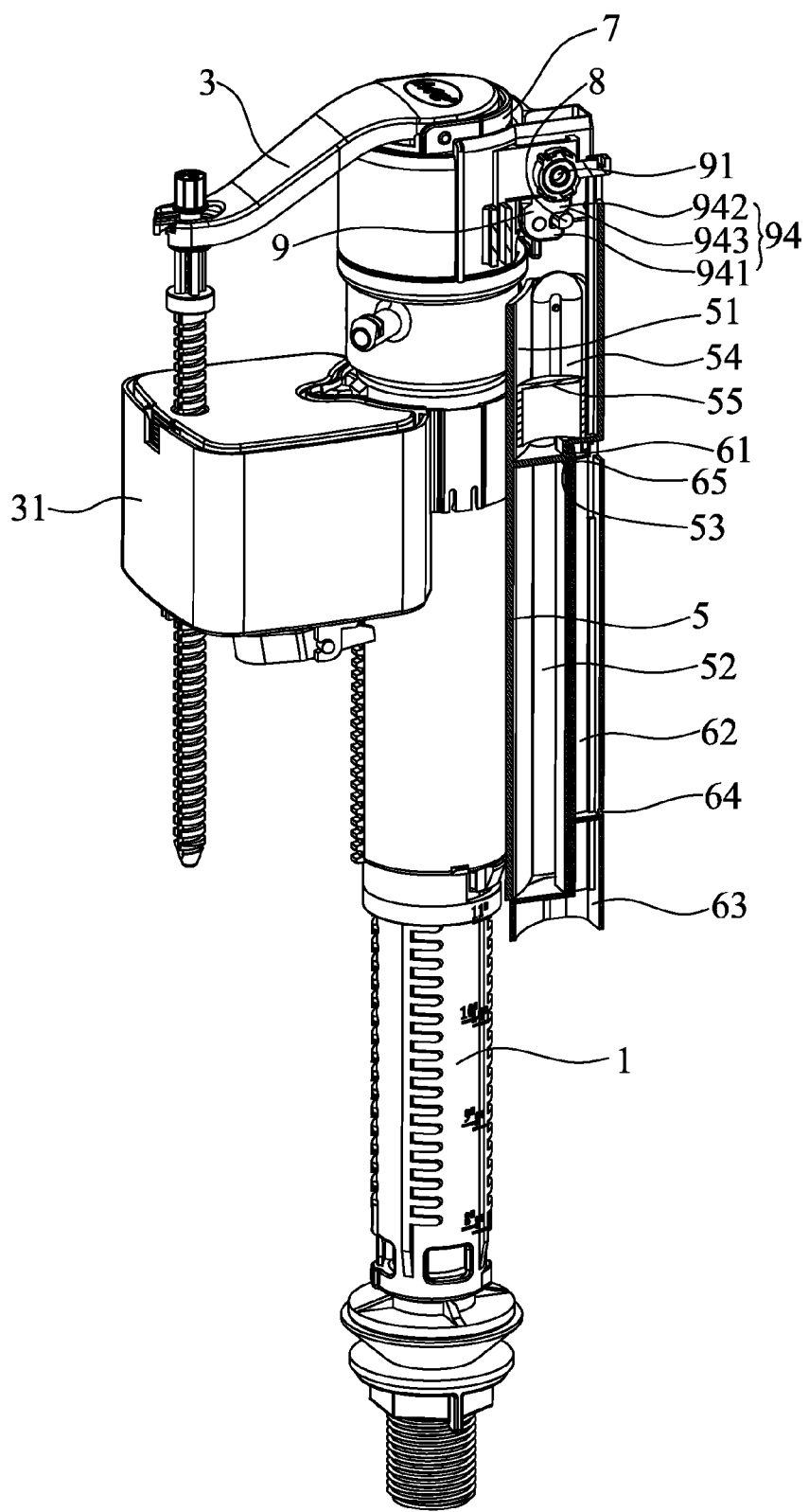
FIG. 8 is a perspective view showing the position relationship of the water storage cylinder and the small buoy according to the preferred embodiment of the present invention.
Figure 9:
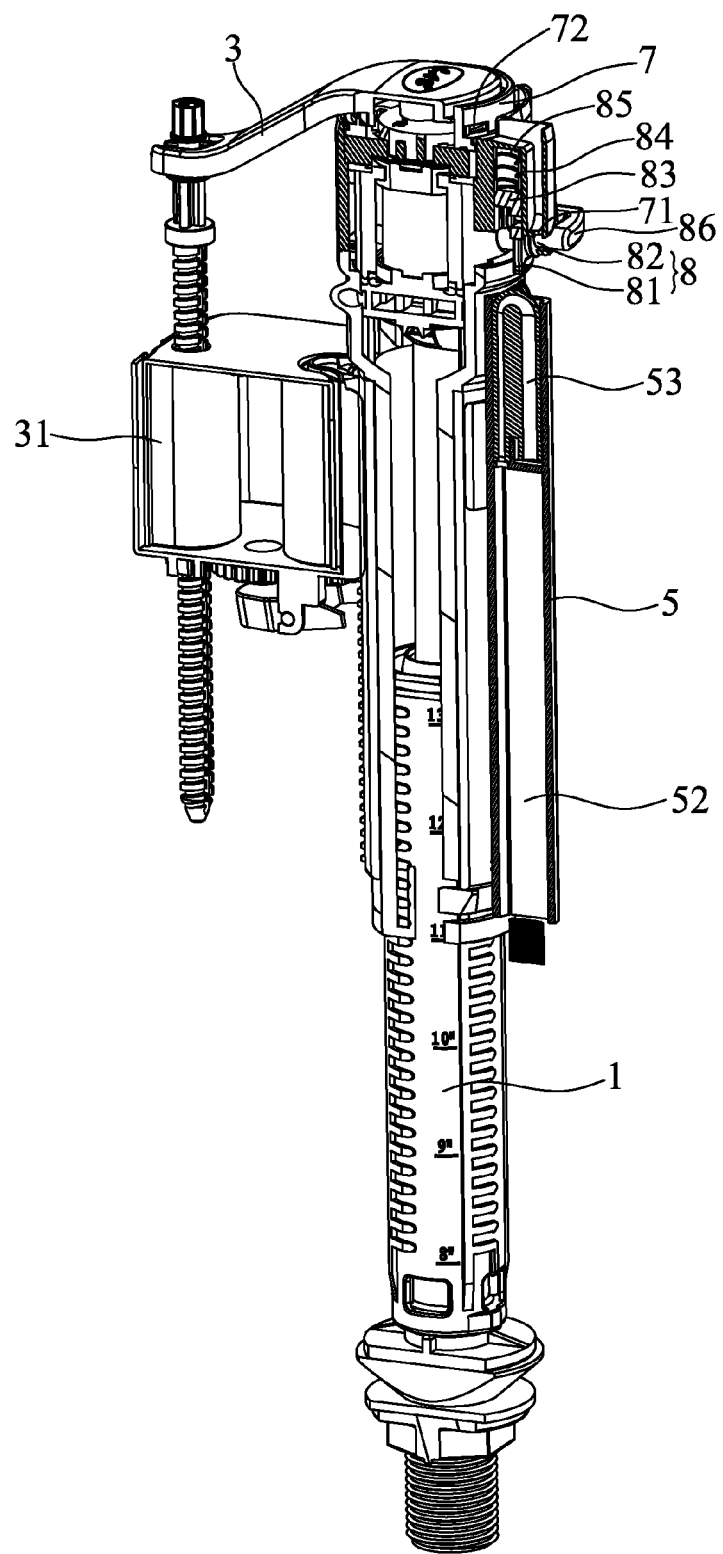
FIG. 9 is a schematic showing the structure of the water storage cylinder according to the preferred embodiment of the present invention.

As shown in FIG. 5 and FIG. 9, the circumferential edge of the top cover 2 is formed with a gutter 7. The gutter 7 is formed with a water drop opening 71 facing the water storage cavity 51 of the water storage cylinder 5. Specifically, the gutter 7 has apertures 72 to guide water. In order to control the speed of the water drop, a sponge is provided in the gutter 7.

As shown in FIG. 1 to FIG. 10, the outsides of the water inlet pipe 1 and the top cover 2 are provided with a connecting rod 8, a lever 9, and a bolt 91. One end of the connecting rod 8 is connected to one end of the lever 9, and another end of the connecting rod 8 is fixed to another end of the eccentric shaft 41. An energy storage spring 85 is provided on the connecting rod 8 or the lever 9. Another end of the lever 9 is provided with the bolt 91 which can be plugged or pulled out. The bolt 91 is provided with a second magnetic element 92 corresponding to the first magnetic element 56. The first magnetic element 56 and the second magnetic element 92 are magnetic adsorption elements. Both the first magnetic element 56 and the second magnetic element 92 can be magnets, alternatively, one is a magnet and the other is an iron element which can be adsorbed by the magnet. The second magnetic element 92 cooperates with the first magnetic element 56 to control the bolt 91 to be pulled out from the lever 9 to release the positioning of the lever 9. The bolt 91 is provided with a restoring spring 93. Through the restoring spring 93, the bolt 91 can be restored to be plugged on the lever 9 for the lever 9 to be positioned. For the transmission effect to get a balance and to be smooth, one end of the lever 9 is formed with a fork 94. The fork 94 has a long outer side 941 and a short inner side 942. The connecting rod 8 is composed of a first connecting rod 81 and a second connecting rod 82. One end of the first connecting rod 81 is disposed in the fork 94, and another end of the first connecting rod 81 is pivotally connected to one end of the second connecting rod 82. The inner side 942 of the fork 94 is formed with an inclined surface 943 which is beneficial to move the first connecting rod 81. Another end of the second connecting rod 82 is fixed to another end of the eccentric shaft 41. The first connecting rod 81 is formed with a lift rod 83 extending from the first connecting rod 81. The lift rod 83 is disposed in a lift trough 84 formed at the outside of the top cover 2. An energy storage spring 85 is provided in the lift trough 84 to be against the lift rod 83. Wherein, the outer side 941 of the fork 94 is designed to be short for the first connecting rod 81 to push the lever 9, not subject to the fork 94, so that the route of the first connecting rod 81 is enough. The inner side 942 of the fork 94 is designed to be long for the first connecting rod 81 to push the lever 9 to restore easily after the breakdown is released. The second connecting rod 82 or the eccentric shaft 41 is formed with a push block 86 to push the connecting rod 8 and to restore the lever 9 conveniently. Another end of the lever 9 (or the bolt 91) is formed with a slope 95 to guide the bolt 91. The lever 9 is provided with a protrusion 96 beside the turning axle so as to limit the turning angle of the lever 9.

The present invention is installed in a water tank. Under an initial state, as shown in FIG. 2 to FIG. 9, the bolt 91 biased by the restoring spring 93 is inserted at one end of the lever 9 to position the lever 9 as well as the connecting rod 8. The connecting rod 8 brings the eccentric shaft 41 to rotate and position. As shown in FIG. 12, the eccentric shaft 41 brings the water sealing piston 4 to descend so as to open the water inlet 15. At this time, the energy storage spring 85 stores energy.

When in normal use, no malfunction, in the beginning of water inflow, the buoy 31 drops by gravity to bring the swing arm 3 to deflect. The back-pressure pad 21 opens the back-pressure hole 22. The water from the water supply pipe flows through the water inlet pipe 1, the water inlet 15, the top cover 2, and the back-pressure hole 22 to the water tank for water inflow. Partial water is guided by the gutter 7 and flows to the water drop opening 71 to form water drops to drop into the water storage cavity 51 of the water storage cylinder 5. When the water level of the water tank ascends, the water still enters the lower water cavity 52 of the water storage cylinder 5. In this embodiment, the water enters the upper counterweight cavity 62 of the small buoy 6 through the communicating hole 64. After the water level of the water tank ascends, the buoy 31 ascends by buoyancy to bring the swing arm 3 to deflect. The back-pressure pad 21 closes the back-pressure hole 22 again. The water cannot enter the water tank through the back-pressure hole 22. The water stop pad 13 generates a back-pressure force to block the water inlet 15 of the water stop surface 14 to stop water inflow.

When the drain valve is operated for a flush, the water level of the water tank and the water level of the lower water cavity 52 of the water storage cylinder 5 will descend. In this embodiment, the water level of the upper counterweight cavity 62 of the small buoy 6 also descends slowly. When the water level descends until the gravity of the small buoy 6 is greater than the buoyancy, the small buoy 6 drops rapidly and brings the opening and closing plate 61 to move down to close the upper air vent 53 of the lower water cavity 52. The water level of the lower water cavity 52 descends continuously and slowly to form a negative pressure in the lower water cavity 52. When the negative pressure reaches a certain degree, the water in the water storage cavity 51 will be siphoned to the lower water cavity 52 through the siphon 54 until the water in the water storage cavity 51 is siphoned out. The siphoning will stop. The water level of the water tank and the water level of the lower water cavity 52 keep on descending till flush. In the meantime, the water level of the water tank descends until the gravity of the buoy 31 is greater than the buoyancy. The buoy 31 brings the swing arm 3 to deflect once again. The back-pressure pad 21 is to open the back-pressure hole 22. The water stop pad 13 releases pressure to disengage from the water stop surface 14 to open the water inlet 15 for water inflow once again. At the same time, partial water is guided by the gutter 7 and flows to the water storage cavity 51 as well as the lower water cavity 52 and the upper counterweight cavity 62. When the water level ascends to the predetermined position, the buoy 31 will bring the swing arm 3 to deflect. The back-pressure pad 21 is to close the back-pressure hole 22 again. The water stop pad 13 generates a back-pressure force to block the water inlet 15 to stop water inflow.

Figure 10:
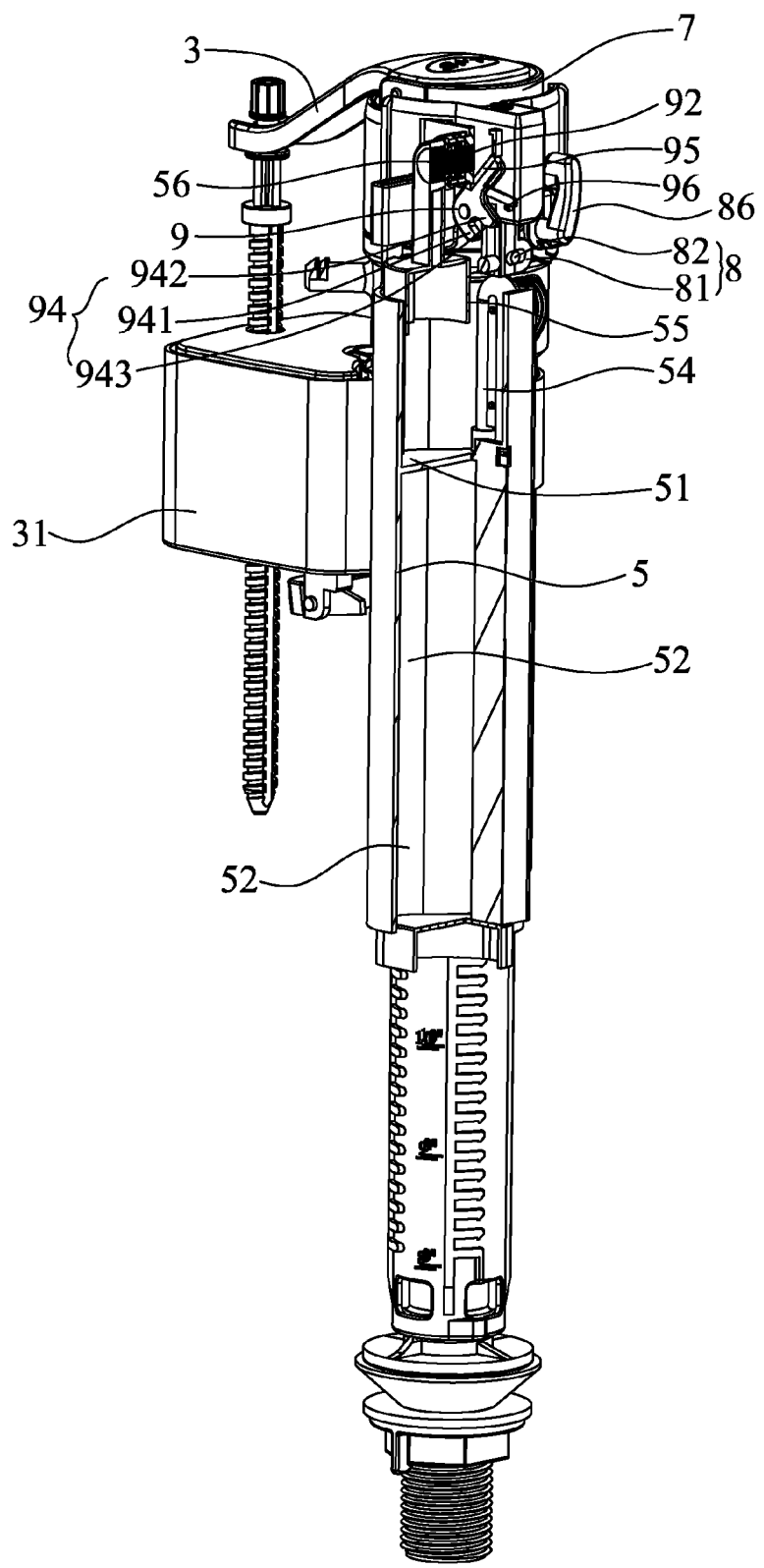
FIG. 10 is a sectional view showing the structure of the water storage cylinder and the small buoy of the preferred embodiment of the present invention in a water stop state.

When the part of the drain valve or the button is jammed and unable to close to cause a leak of much water, or the part of the water inlet valve malfunctions and is unable to stop water inflow to cause an overflowing, or the component of the water tank malfunctions to cause a leak, the water inlet valve will be in a feeding state all the time. Partial water is still guided by the gutter 7 to flow into the water storage cavity 51. Because the water inlet valve is in a feeding state all the time, the water level of the water storage cavity 51 ascends continuously to bring the floater 55 in the water storage cavity 51 to ascend accordingly. When the first magnetic element 56 of the floater 55 is aligned with the second magnetic element 92 of the bolt 91, as shown in FIG. 10, the bolt 91 is pulled out from the lever 9 by magnetic action to release the positioning of the lever 9. The bolt 91 compresses the restoring spring 93. The lever 9 and the connecting rod 8 are biased by the energy storage spring 85 to deflect. In this embodiment, the energy storage spring 80 pushes the lift rod 83 down to move the first connecting rod 81 down. The first connecting rod 81 cooperates with the fork 94 to bring the lever 9 to deflect. The first connecting rod 81 brings the second connecting rod 82 to deflect. The connecting rod 8 (this embodiment is the second connecting rod 82) brings the eccentric shaft 41 to rotate. As shown in FIG. 11, the eccentric shaft 41 rotates to form a concession space for the water sealing piston 4 to ascend. The water sealing piston 4 is ascended by the action of water pressure to close the water inlet 15 for the water inlet valve to stop water inflow.

When the drain valve is leaking or the sealing portion of the water tank and the other part is leaking, namely, there is a leak of little water, the counterweight water level of the small buoy 6 and the water level of the water tank are consistent relatively. The small buoy 6 is unable to bring counterweight and in a floating state all the time. The lower water cavity 52 of the water storage cylinder 5 communicates with the atmosphere all the time, so that its water level is consistent with the water tank and won't generate native pressure. The water in the water storage cavity 51 won't be siphoned. This way is done repeatedly. The water in the water storage cavity 51 is accumulated continuously, so that the water level of the water storage cavity 51 ascends continuously to bring the floater 55 in the water storage cavity 51 to ascend accordingly. When the first magnetic element 56 of the floater 55 is aligned with the second magnetic element 92 of the bolt 91, the bolt 91 is pulled out from the lever 9 by magnetic action to release the positioning of the lever 9. The lever 9 and the connecting rod 8 are biased by the energy storage spring 85 to deflect. The connecting rod 8 brings the eccentric shaft 41 to rotate. The eccentric shaft 41 brings the water sealing piston 4 to ascend to close the water inlet 15, such that the water inlet valve stops feeding.

After the malfunction of the water tank is solved to overcome the magnetic force of the first magnetic element 56 and the second magnetic element 2, the floater 55 is taken out from the bolt 91 and then the push block 86 is pushed to restore the first connecting rod 81, the second connecting rod 82, and the lever 9. The energy storage spring 80 stores energy once again. The eccentric shaft 41 is also restored to bring the water sealing piston 4 to move down to open the water inlet 15, such that the water inlet valve is restored to a normal state, as shown in FIG. 2 to FIG. 9.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A water inlet valve, comprising a water inlet pipe, a top cover, a water stop pad, a back-pressure pad, a swing arm, and a buoy, a water inlet cavity being formed by the top cover and an interior of the water inlet pipe, a water sealing piston and an eccentric shaft being provided in the water inlet cavity and located below the water stop pad, one end of the eccentric shaft being inserted through the water sealing piston, another end of the eccentric shaft, in a closed state, extending out of the water inlet cavity, the water sealing piston being brought by the eccentric shaft to move up and down along an axial direction to close or open a water inlet of a water stop surface; a water storage cylinder being fixed to an outside of the water inlet pipe, the water storage cylinder having a water storage cavity at an upper portion thereof and a lower water cavity at a lower portion thereof, a top of the water storage cavity being open, the lower water cavity having an upper air vent and a lower water inlet, a siphon being installed in the water storage cavity, one end of the siphon being disposed close to a bottom of the water storage cavity, another end of the siphon being inserted through the bottom of the water storage cavity and communicated with the lower water cavity, a floater being provided in the water storage cavity, a first magnetic element being installed on top of the floater; an outside of the water storage cylinder being provided with a small buoy in a liftable way, the small buoy being provided with an opening and closing plate corresponding to the upper air vent of the lower water cavity, the opening and closing plate being capable of opening or closing the upper air vent as the small buoy is lifted or dropped; a circumferential edge of the top cover being formed with a gutter, the gutter being formed with a water drop opening facing the water storage cavity of the water storage cylinder; the outsides of the water inlet pipe and the top cover being provided with a connecting rod, a lever, and a bolt, one end of the connecting rod being connected to one end of the lever, another end of the connecting rod being fixed to another end of the eccentric shaft, an energy storage spring being provided on the connecting rod or the lever, another end of the lever being provided with the bolt which can be plugged or pulled out, the bolt being provided with a second magnetic element corresponding to the first magnetic element for controlling the bolt to be pulled out and a restoring spring for the bolt to be restored and plugged.

2. The water inlet valve as claimed in claim 1, wherein a seal ring is provided between the eccentric shaft and an opening of the water inlet cavity, a seal pad being provided above the water sealing piston.

3. The water inlet valve as claimed in claim 1, wherein a sponge is provided in the gutter for controlling a speed of water drops.

4. The water inlet valve as claimed in claim 1, wherein a top of the water inlet pipe is formed with an inner protrusion, a water sealing spring being installed on the inner protrusion, an upper end of the water sealing spring being against a bottom of the water sealing piston, a lower end of the water sealing spring being against the inner protrusion.

5. The water inlet valve as claimed in claim 1, wherein a side wall of the water storage cylinder is formed with a slide trough, the upper air vent being disposed in the slide trough, the small buoy having an upper counterweight cavity and a lower buoyancy cavity, the upper counterweight cavity being slidably disposed in the slide trough, a lower portion of an outer side wall of the upper counterweight cavity being formed with a communicating hole, an upper portion of an inner side wall of the upper counterweight cavity being formed with the opening and closing plate corresponding to the upper air vent, the opening and closing plate being inclined toward the upper air vent, a lower end of the opening and closing plate being formed with an air release opening, the lower buoyancy cavity being located under the water storage cylinder.

6. The water inlet valve as claimed in claim 1, wherein one end of the lever is formed with a fork, the fork having a long outer side and a short inner side, the connecting rod being composed of a first connecting rod and a second connecting rod, one end of the first connecting rod being disposed in the fork, another end of the first connecting rod being pivotally connected to one end of the second connecting rod, another end of the second connecting rod being fixed to another end of the eccentric shaft, the first connecting rod being formed with a lift rod extending from the first connecting rod, the lift rod being disposed in a lift trough formed at an outside of the top cover, an energy storage spring being provided in the lift trough to be against the lift rod.

7. The water inlet valve as claimed in claim 6, wherein the inner side of the fork is formed with an inclined surface which is beneficial to move the first connecting rod.

8. The water inlet valve as claimed in claim 1, wherein the connecting rod or the eccentric shaft is formed with a push block to push the connecting rod and to restore the lever.

9. The water inlet valve as claimed in claim 1, wherein another end of the lever or the bolt is formed with a slope to guide the bolt to be plugged in.

10. The water inlet valve as claimed in claim 1, wherein the lever is provided with a protrusion beside a turning axle thereof to limit the turning angle of the lever.

* * * * *